(12) United States Patent
Cutsinger et al.

(10) Patent No.: US 8,522,154 B2
(45) Date of Patent: Aug. 27, 2013

(54) SCENARIO SPECIALIZATION OF FILE BROWSER

(75) Inventors: Paul Cutsinger, Redmond, WA (US); Cornelis K. Van Dok, Bellevue, WA (US); David G. De Vorchik, Seattle, WA (US); Eli Y. Tamanaha, Lynnwood, WA (US); Kenneth M. Tubbs, Bellevue, WA (US); Lyon K. F. Wong, Issaquah, WA (US); Paul Gusmorino, Seattle, WA (US); Sasanka Chalivendra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2554 days.

(21) Appl. No.: 11/111,984

(22) Filed: Apr. 22, 2005

(65) Prior Publication Data

US 2006/0242585 A1     Oct. 26, 2006

(51) Int. Cl.
*G06F 3/048* (2006.01)
(52) U.S. Cl.
USPC ........................................................ 715/764
(58) Field of Classification Search
USPC ................... 715/775–779, 764, 765
See application file for complete search history.

(56) References Cited

U.S. PATENT DOCUMENTS

| | | | |
|---|---|---|---|
| 5,241,671 A | 8/1993 | Reed et al. | |
| 5,333,315 A | 7/1994 | Saether et al. | |
| 5,388,196 A | 2/1995 | Pajak et al. | |
| 5,461,710 A | 10/1995 | Bloomfield et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,559,948 A | 9/1996 | Bloomfield et al. | |
| 5,598,524 A | 1/1997 | Johnston, Jr. et al. | |
| 5,630,042 A | 5/1997 | McIntosh et al. | |
| 5,680,563 A | 10/1997 | Edelman | |
| 5,696,486 A | 12/1997 | Poliquin et al. | |
| 5,757,925 A | 5/1998 | Faybishenko | |
| 5,790,121 A | 8/1998 | Sklar et al. | |
| 5,802,516 A | 9/1998 | Shwarts et al. | |
| 5,831,606 A | 11/1998 | Nakajima et al. | |
| 5,835,094 A | 11/1998 | Ermel et al. | |

(Continued)

FOREIGN PATENT DOCUMENTS

| | | |
|---|---|---|
| CN | 1421800 | 11/2001 |
| GB | 2329492 | 3/1999 |

(Continued)

OTHER PUBLICATIONS

McFedries, Paul; "The Complete Idiot's Guide to Windows XP", Table of Contents, Oct. 3, 2001; Alpha Books, Ch. 6: Using My Computer to Fiddle w/h Files and Folder-printed pg. 1-6, Finding a File in Mess p. 103.

(Continued)

*Primary Examiner* — Thanh Vu
(74) *Attorney, Agent, or Firm* — Shook, Hardy & Bacon (57) ABSTRACT

In a graphical user interface environment, a situational-specific browser may be used to provide contextually appropriate levels of information for files whose information is to be displayed. As different views of files are to be displayed, the browser may dynamically adjust its configuration to display different types of information, features and/or command options. Different views may be predefined, or new views may be dynamically created in response to user navigation.

15 Claims, 7 Drawing Sheets

(56) References Cited

U.S. PATENT DOCUMENTS

| | | |
|---|---|---|
| 5,838,317 A | 11/1998 | Bolnick et al. |
| 5,838,322 A | 11/1998 | Nakajima et al. |
| 5,867,163 A | 2/1999 | Kurtenbach |
| 5,875,446 A | 2/1999 | Brown et al. |
| 5,878,410 A | 3/1999 | Zbikowski et al. |
| 5,899,995 A | 5/1999 | Millier et al. |
| 5,923,328 A | 7/1999 | Griesmer |
| 5,929,854 A | 7/1999 | Ross |
| 5,933,139 A | 8/1999 | Feigner et al. |
| 5,935,210 A | 8/1999 | Stark |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,021,262 A | 2/2000 | Cote et al. |
| 6,023,708 A | 2/2000 | Mendez et al. |
| 6,025,843 A | 2/2000 | Sklar |
| 6,037,944 A | 3/2000 | Hugh |
| 6,061,692 A | 5/2000 | Thomas et al. |
| 6,061,695 A | 5/2000 | Slivka et al. |
| 6,078,924 A | 6/2000 | Ainsbury et al. |
| 6,097,389 A | 8/2000 | Morris et al. |
| 6,144,968 A | 11/2000 | Zellweger |
| 6,147,601 A | 11/2000 | Sandelman et al. |
| 6,181,342 B1 | 1/2001 | Niblack |
| 6,202,061 B1 | 3/2001 | Khosla et al. |
| 6,237,011 B1* | 5/2001 | Ferguson et al. ............ 715/234 |
| 6,240,421 B1 | 5/2001 | Stolarz |
| 6,243,094 B1 | 6/2001 | Sklar |
| 6,243,724 B1 | 6/2001 | Mander et al. |
| 6,246,411 B1 | 6/2001 | Strauss |
| 6,256,031 B1 | 7/2001 | Meijer et al. |
| 6,275,829 B1 | 8/2001 | Angiulo et al. |
| 6,308,173 B1 | 10/2001 | Glasser et al. |
| 6,317,142 B1 | 11/2001 | Decoste et al. |
| 6,324,551 B1 | 11/2001 | Lamping et al. |
| 6,339,767 B1 | 1/2002 | Rivette et al. |
| 6,341,280 B1 | 1/2002 | Glass et al. |
| 6,363,377 B1 | 3/2002 | Kravets et al. |
| 6,363,400 B1 | 3/2002 | Chtchetkine et al. |
| 6,401,097 B1* | 6/2002 | McCotter et al. ............ 707/102 |
| 6,411,311 B1 | 6/2002 | Rich et al. |
| 6,430,575 B1 | 8/2002 | Dourish et al. |
| 6,437,807 B1 | 8/2002 | Berquist et al. |
| 6,448,985 B1 | 9/2002 | McNally |
| 6,453,311 B1 | 9/2002 | Powers, III |
| 6,453,319 B1 | 9/2002 | Mattis et al. |
| 6,466,238 B1 | 10/2002 | Berry et al. |
| 6,466,932 B1 | 10/2002 | Dennis et al. |
| 6,480,835 B1 | 11/2002 | Light |
| 6,505,233 B1 | 1/2003 | Hanson et al. |
| 6,513,038 B1 | 1/2003 | Hasegawa et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,549,217 B1 | 4/2003 | De Greef et al. |
| 6,549,916 B1 | 4/2003 | Sedlar |
| 6,563,514 B1 | 5/2003 | Samar |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,662,198 B2 | 12/2003 | Satyanarayanan et al. |
| 6,684,222 B1 | 1/2004 | Cornelius et al. |
| 6,735,623 B1 | 5/2004 | Prust |
| 6,738,770 B2 | 5/2004 | Gorman |
| 6,745,206 B2 | 6/2004 | Mandler et al. |
| 6,754,829 B1 | 6/2004 | Butt et al. |
| 6,762,776 B2 | 7/2004 | Huapaya |
| 6,762,777 B2 | 7/2004 | Carroll |
| 6,763,458 B1 | 7/2004 | Watanabe et al. |
| 6,768,999 B2 | 7/2004 | Prager et al. |
| 6,784,900 B1 | 8/2004 | Dobronsky et al. |
| 6,795,094 B1 | 9/2004 | Watanabe et al. |
| 6,801,919 B2 | 10/2004 | Hunt et al. |
| 6,803,926 B1 | 10/2004 | Lamb et al. |
| 6,816,863 B2 | 11/2004 | Bates et al. |
| 6,823,344 B1 | 11/2004 | Isensee et al. |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk et al. |
| 6,922,709 B2 | 7/2005 | Goodman |
| 6,938,207 B1 | 8/2005 | Haynes |
| 6,944,647 B2 | 9/2005 | Shah et al. |
| 6,947,959 B1 | 9/2005 | Gill |
| 6,950,818 B2 | 9/2005 | Dennis et al. |
| 6,952,724 B2 | 10/2005 | Prust |
| 6,980,993 B2 | 12/2005 | Horvitz et al. |
| 7,010,755 B2 | 3/2006 | Anderson et al. |
| 7,051,291 B2 | 5/2006 | Sciammarella et al. |
| 7,068,291 B1 | 6/2006 | Roberts et al. |
| 7,139,811 B2 | 11/2006 | Lev Ran et al. |
| 7,203,948 B2 | 4/2007 | Mukundan et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0103998 A1 | 8/2002 | DeBruine |
| 2002/0104069 A1 | 8/2002 | Gouge et al. |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138744 A1 | 9/2002 | Schleicher et al. |
| 2002/0152262 A1 | 10/2002 | Arkin et al. |
| 2002/0152267 A1 | 10/2002 | Lennon |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0184357 A1 | 12/2002 | Traversat et al. |
| 2002/0188605 A1 | 12/2002 | Adya et al. |
| 2002/0188735 A1 | 12/2002 | Needham et al. |
| 2002/0194252 A1 | 12/2002 | Powers, III |
| 2002/0196276 A1 | 12/2002 | Corl et al. |
| 2002/0199061 A1 | 12/2002 | Friedman et al. |

| | | |
|---|---|---|
| 2003/0009484 A1 | 1/2003 | Hamanaka et al. |
| 2003/0014415 A1 | 1/2003 | Weiss et al. |
| 2003/0018657 A1 | 1/2003 | Monday |
| 2003/0018712 A1 | 1/2003 | Harrow et al. |
| 2003/0028610 A1 | 2/2003 | Pearson |
| 2003/0041178 A1 | 2/2003 | Brouk et al. |
| 2003/0046260 A1 | 3/2003 | Satyanarayanan et al. |
| 2003/0069893 A1 | 4/2003 | Kanai et al. |
| 2003/0069908 A1 | 4/2003 | Anthony et al. |
| 2003/0074356 A1 | 4/2003 | Kaler et al. |
| 2003/0078918 A1 | 4/2003 | Souvignier et al. |
| 2003/0093321 A1 | 5/2003 | Bodmer et al. |
| 2003/0093580 A1 | 5/2003 | Thomas et al. |
| 2003/0101200 A1 | 5/2003 | Koyama et al. |
| 2003/0105745 A1 | 6/2003 | Davidson et al. |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0177422 A1 | 9/2003 | Tararoukhine et al. |
| 2003/0184587 A1 | 10/2003 | Ording et al. |
| 2003/0210281 A1 | 11/2003 | Ellis et al. |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0008226 A1 | 1/2004 | Manolis et al. |
| 2004/0019584 A1 | 1/2004 | Greening et al. |
| 2004/0019655 A1 | 1/2004 | Uemura et al. |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056896 A1 | 3/2004 | Doblmayr et al. |
| 2004/0068524 A1 | 4/2004 | Aboulhosn et al. |
| 2004/0070612 A1 | 4/2004 | Sinclair et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103280 A1 | 5/2004 | Balfanz et al. |
| 2004/0117358 A1 | 6/2004 | von Kaenel et al. |
| 2004/0133572 A1 | 7/2004 | Bailey et al. |
| 2004/0133588 A1 | 7/2004 | Kiessig et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0249902 A1 | 12/2004 | Tadayon et al. |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0149481 A1 | 7/2005 | Hesselink et al. |
| 2005/0166159 A1 | 7/2005 | Mondry et al. |
| 2005/0171947 A1 | 8/2005 | Gautestad |
| 2005/0192953 A1 | 9/2005 | Neale et al. |
| 2005/0192966 A1 | 9/2005 | Hilbert et al. |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0053388 A1* | 3/2006 | Michelman .................. 715/775 |
| 2006/0080308 A1 | 4/2006 | Carpentier et al. |
| 2006/0129627 A1 | 6/2006 | Phillips et al. |
| 2006/0173873 A1 | 8/2006 | Prompt et al. |
| 2006/0200466 A1 | 9/2006 | Kaasten et al. |
| 2006/0200832 A1 | 9/2006 | Dutton |
| 2006/0218122 A1 | 9/2006 | Poston et al. |

FOREIGN PATENT DOCUMENTS

| | | |
|---|---|---|
| WO | 9938092 | 7/1999 |
| WO | 01/63919 A1 | 8/2001 |
| WO | WO 0225420 | 3/2002 |
| WO | WO 2004107151 | 9/2004 |

OTHER PUBLICATIONS

Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407, 2003.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/feature1.htm, archived on Feb. 7, 2003; http://web.archive.org/web/20021017022627/www.ghislercom/addons.htm, archived on Oct. 17, 2002; http://web.archive.org/web/20021009213316/www.ghisler.com/efaquser.htm, archived on Oct. 9, 2003; unable to access website.
Bott, et al., Microsoft Windows XP Inside Out, Microsoft Press, 2001, Chapter 11, 39 pages.

Microsoft Press Pass, "Windows XP is Here!", New York, Oct. 25, 2001.
Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia—printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
Examples of dialogs user interfaces; date of first publication prior to Mar. 31, 2005; 8 pages.
"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.
New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.
Windows Forms: Exploiting Windows Longhorn Features from Within Your Application (CLI 391); downloaded from http://msdn.microsoft.com/longhorn/pdcmaterials/pdctalksavalon/>; date of first publication prior to Mar. 31, 2005; 27 pages.
MessageBox Function; downloaded from <http://msdn.microsoft.com>; date of first publication prior to Mar. 31, 2005; 4 pages.
Creating and Installing Theme Files; downloaded from <http://msdn.microsoft.com>; date of first publication prior to Feb. 21, 2005; 4 pages.
"MessageBox Function"; downloaded from <http://msdn.microsoft.com>; date of first publication prior to Mar. 31, 2005; 4 pages.
"Creating and Installing Theme Files"; downloaded from <http://msdn.microsoft.com>; date of first publication prior to Feb. 21, 2005; 4 pages.
"About Dialog Boxes"; downloaded from <http://msdn.microsoft.com>; date of first publication prior to Feb. 21, 2005; 10 pages.
"Property Sheets and Inspectors"; downloaded from <http://msdn.microsoft.com>; date of first publication prior to Feb. 21, 2005; 6 pages.
"PROPSHEETPAGE"; downloaded from <http://msdn.microsoft.com>; date of first publication prior to Feb. 21, 2005; 3 pages.
"DialogProc Function"; downloaded from <http://msdn.microsoft.com>; date of first publication prior to Feb. 21, 2005; 2 pages.
"Creating Wizards"; downloaded from <http://msdn microsoft.com>; date of first publication prior to Mar. 31, 2005; 17 pages.
"Property Sheets"; downloaded from <http://msdn.microsoft.com>; date of first publication prior to Mar. 31, 2005; 7 pages.
"Property Sheet Reference"; downloaded from <http://msdn.microsoft.com>; date of first publication prior to Mar. 31, 2005; 5 pages.
"DRAWITEMSTRUCT Structure"; downloaded from <http://msdn.microsoft.com>; date of first publication prior to Feb. 25, 2005; 3 pages.
"Using Buttons"; downloaded from <http://msdn.microsoft.com>; date of first publication prior to Feb. 25, 2005; 5 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertySheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_KILLACTIVE Notification"; downloaded from <http://msdn.microsoft.com>; date of first publication prior to Mar. 31, 2005; 1 page.
"PSN_QUERYCANCEL Notification"; downloaded from <http://msdn.microsoft.com>; date of first publication prior to Mar. 31, 2005; 1 page.
"PSN_RESET Notification"; downloaded from <http://msdn.microsoft.com>; date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSN_TRANSLATEACCELERATOR Notification"; downloaded from <http://msdn.microsoft.com>; date of first publication prior to Mar. 31, 2005; 1 page.
"PSN_WIZBACK Notification"; downloaded from <http://msdn.microsoft.com>; date of first publication prior to Mar. 31, 2005; 3 pages.
"PSN_WIZFINISH Notification" ; downloaded from <http://msdn.microsoft.com>; date of first publication prior to Mar. 31, 2005; 1 page.
"PSN_WIZNEXT Notification"; downloaded from <http://msdn.microsoft.com>; date of first publication prior to Mar. 31, 2005; 3 pages.
"PSM_ADDPAGE Message"; downloaded from <http://msdn.microsoft.com>; date of first publication prior to Mar. 31, 2005; 2 pages.
"PSM_IDTOINDEX Message"; downloaded from <http://msdn.microsoft.com>; date of first publication prior to Mar. 31, 2005; 1 page.
"PSM_INDEXTOHWND Message"; downloaded from <http://msdn.microsoft.com>; date of first publication prior to Mar. 31, 2005; 1 page.
"PSM_INDEXTOID Message"; downloaded from <http://msdn.microsoft.com>; date of first publication prior to Mar. 31, 2005; 1 page.
"PSM_INDEXTOPAGE Message"; downloaded from <http://msdn.microsoft.com>; date of first publication prior to Mar. 31, 2005; 1 page.
"PSM_PAGETOINDEX Message"; downloaded from <http://msdn.microsoft.com>; date of first publication prior to Mar. 31, 2005; 1 page.
"PSM_PRESSBUTTON Message"; downloaded from <http://msdn.microsoft.com>; date of first publication prior to Mar. 31, 2005; 1 page.
"PSM_QUERYSIBLINGS Message" ; downloaded from <http://msdn.microsoft.com>; date of first publication prior to Mar. 31, 2005; 1 page.
"PSM_SETCURSEL Message"; downloaded from <http://msdn.microsoft.com>; date of first publication prior to Mar. 31, 2005; 1 page.
"PSM_SETCURSELID Message"; downloaded from <http://msdn.microsoft.com>; date of first publication prior to Mar. 31, 2005; 1 page.
"PSM_SETFINISHTEXT Message"; downloaded from <http://msdn.microsoft.com>; date of first publication prior to Mar. 31, 2005; 1 page.
"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.
"PROPSHEETHEADER Structure" ; downloaded from <http://msdn.microsoft.com>; date of first publication prior to Mar. 31, 2005; 5 pages.
"PROPSHEETPAGE Structure"; downloaded from <http://msdn.microsoft.com>; date of first publication prior to Mar. 31, 2005; 4 pages.
"PSHNOTIFY Structure"; downloaded from <http://msdn.microsoft.com>; date of first publication prior to Mar. 31, 2005; 1 page.
"BCM_GETIDEALSIZE Message"; downloaded from <http://msdn.microsoft.com>; date of first publication prior to Mar. 31, 2005; 1 page.
"PSM_SETTITLE Message"; downloaded from <http://msdn.microsoft.com>; date of first publication prior to Mar. 31, 2005; 1 page.
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-Data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualIFS: A New Journaling File System Without Meta-Data Duplication," Conference Proceedings of the 2002 International Conference on Supercomputing, New York, Jun. 22-26, 2002, p. 137-146.
Manber, U., and S. Wu, "Glimpse: A Tool to Search Through Entire File Systems," Proceedings of USENIX Winter 1994 Conference, San Francisco, CA, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE—Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.
Yamai, N. et al., "NFS-Based Secure File Sharing Over Multiple Administrative Domains With Minimal Administration," Systems and Computers in Japan 33(14):50-58, Dec. 2002.
Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.
Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.
Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.
Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.
Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.
Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.
B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.
"Predefined Properties" http://help.sap.comlsaphelp - ep50sp5/helpdata/en/la/9a4a3b80f2ec40aa7456bc87a94259/content.htm.
"Info Vision Infonnation Management System" http://66.1 02. 7.1 04/search?q=cache:m IXV6K6sQOQJ:www.amlib.netlproducts/infovision.htm+customised+multi+property+file+navigation& hl=en.
"Previewing Files in the Common Dialog" http://www .elitevb.comlcontentiO 1,0084,0 II.
"TdcFolderListView component" http://www.appcontrols.comlmanualsldiskcontrols/index.htm1?tdcfolderlistview.htm.
"Previewing Files" http://developer.apple.comIdocumentation/QuickTimelINMAC/QT/iqMovieToolbox.1a.htm.
"Text File Previewer 2.0 Beta" http://www .freedownloadscenter.comlUtilitiesIText- ViewerslText- File ]reviewer.html.
"Your Next OS: Windows 2006?" http://www.pcworld.comlnewsiarticle/O,aid,ll3'631,OO.asp.
"GetOpenFileName Function," downloaded from <http://msdn.microsoft.com>; date of first publication prior to Mar. 28, 2005; 2 pages.
"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pages.

"Creating an Enhanced Metafile," downloaded from <http://msdn.microsoft.com>; date of first publication prior to Mar. 28. 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

International Search Report and Written Opinion of PCT/US04/25931 dated Apr. 3, 2007.

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghislerconn/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Wikipedia, File Allocation Table, <http://en.wikipedia.org/wiki/File_Allocation_Table>.

Cohen, et al., "A Case for Associative Peer to Peer Overlays"—ACM SIGCOMM Computer Communications Review, vol. 33, No. 1, Jan. 2003, pp. 95-100.

Lui, et al., "Interoperability of Peer-to-Peer File Sharing Protocols"—ACM SIGecom Exchanges, vol. 3, No. 3, Aug. 2002, pp. 25-33.

Bott, et al., Book titled "Special Edition Using Windows 98, Second Edition", Dec. 21, 1999, second edition, pp. 1-7.

Supplementary European Search Report for EP 04780390 dated Jun. 18, 2007.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

A.T. McCray, et al., Extending the Role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages With Rules", Microsoft® Outlook® 2003 Help file, 3 pp.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al) dated Nov. 11, 2004.

* cited by examiner

SCENARIO SPECIALIZATION OF FILE BROWSER

TECHNICAL FIELD

The present application relates generally to the field of computer software. More particularly, the application relates to a system and method for providing an improved user interface when browsing files on a computer system. The application relates to the display of information regarding such files, and for allowing user interaction with this information.

BACKGROUND OF THE INVENTION

To the relief of trees everywhere, the proliferation of digital documents has rendered paper documents obsolete in many situations. Digital technology has made it easy to duplicate and distribute digital versions of what used to be reams and reams of paper filed in countless filing cabinets. While the technology for capturing these documents has changed dramatically over the years, the approach to organizing them and retrieving them generally has not.

Today, file systems still use the traditional concept of filing cabinets and folders in organizing data, where files are logically "placed" in one of the folders on the system. Browsing for these files is just as archaic, and still resembles manually rifling through a filing cabinet full of paper documents. A file is considered to be stored in just one folder location, and the user is forced to look through a number of folders and subfolders to peruse the documents that are on the computer system. Additionally, the browsing interface provided to the user is static, and largely ignorant of the significance of the data being displayed. This ignorance and static browsing capabilities limits the amount of information provided to the user, and tends to complicate and prolong the user's efforts at browsing for files in the system.

Figure 2:
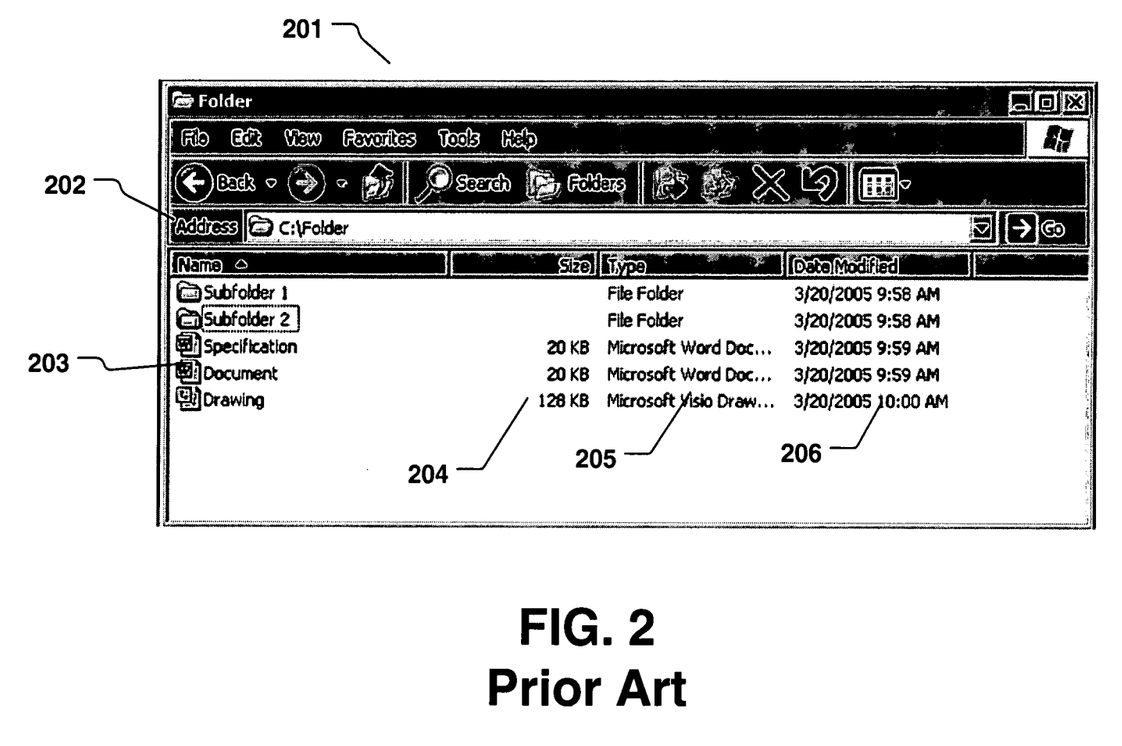
FIG. 2 is an example browser panel found in MICROSOFT WINDOWS XP®.

For example, FIG. 2 shows an example of a browser panel 201 offered in the MICROSOFT WINDOWS XP® operating system. The panel 201 shows the contents of a folder (C:\Folder), which contains a number of subfolders and files, and includes the folder address 202, the names 203 of the various elements shown, their size 204, their type 205, and their date of modification 206. The layout of panel 201 is the same regardless of the contents being displayed, even if the panel's layout would result in an inefficient display. For example, the system shows a blank for the size of the two subfolders, but if "C:\Folder" contained only subfolders, the browser panel 201 would still display the "Size" column 204, with an entire column of blank entries. This column of blanks would still occupy the same width allotted to the Size column 204 in the panel's display format, and may well force certain more meaningful information off of the current display area.

Today's computer systems are being presented with more and more digital files to manage, and there is an ever-present need to improve the efficiency and clarity with which file information is give to the user as the user browses the files on the system. Prior browsers, such as panel 201, have room for improvement in this area, and such improvements are described below.

SUMMARY OF THE INVENTION

Aspects of the present invention may meet one or more of the above needs, and overcome one or more deficiencies in the prior art, by providing a system and method in which the user is given an improved file browsing interface.

The browsing interface may vary depending on the contents to be displayed. In some instances, the browsing interface may customize the user interface options presented in the browser panel in accordance with the contents to be displayed. The browser may rearrange, remove, and/or add displayed properties in accordance with the contents.

Other aspects of the browser's features, appearance, and/or organization may be customized based on the contents.

One or more templates may be provided and/or created to provide a predetermined set of criteria for generating a browser panel.

Software interfaces may be provided to allow development of additional browser panels by users and/or applications.

User interaction with such a browser may cause further alterations in the browser's appearance and/or functionality.

BRIEF DESCRIPTION OF THE DRAWINGS

Features of the applicants' system are described in detail below with reference to the attached drawing figures, wherein.

DETAILED DESCRIPTION OF THE INVENTION

The present invention relates to a system and method for providing an improved user experience when browsing files on a system. An exemplary operating environment for the present invention is described below.

Figure 1:
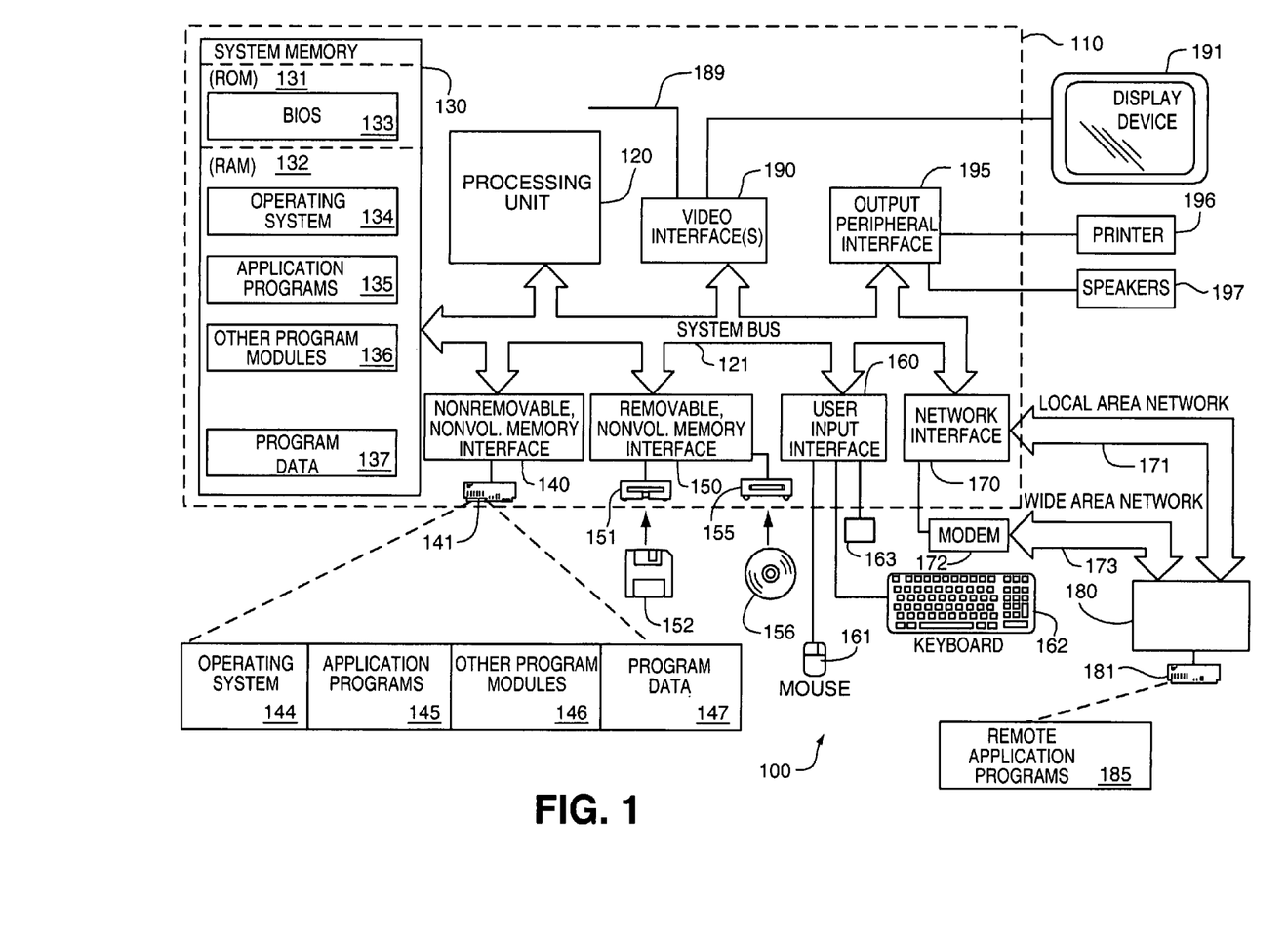
FIG. 1 is a block diagram of a computing-system environment suitable for use in implementing one or more features described herein.

Referring to the drawings in general and initially to FIG. 1 in particular, wherein like reference numerals identify like components in the various figures, an exemplary operating environment is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The features described herein may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the features may be practiced with a variety of computer-system configurations, including hand-held devices, multiprocessor systems, microprocessor-based or programmable-consumer electronics, minicomputers, mainframe computers, and the like. They may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 includes a general purpose computing device in the form of a computer 110 including a processing unit 120, a system memory 130, and a system bus 121 that couples various system components including the system memory 130 to the processing unit 120. If desired, any of the elements described herein may be implemented as standalone elements (e.g., a single processing unit), or as multiple elements working in concert (e.g., multiple processing units).

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Other internal components of the computer 110 are possible, but not shown. For example, various expansion cards such as television-tuner cards and network-interface cards may be incorporated within a computer 110.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the features described herein may be described and implemented in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

FIG. 2 has already been addressed above, and depicts a panel used in the MICROSOFT WINDOWS XP™ operating system to allow users to browse for files of all types (e.g., data, applications, etc.) available through the system.

Figure 3:
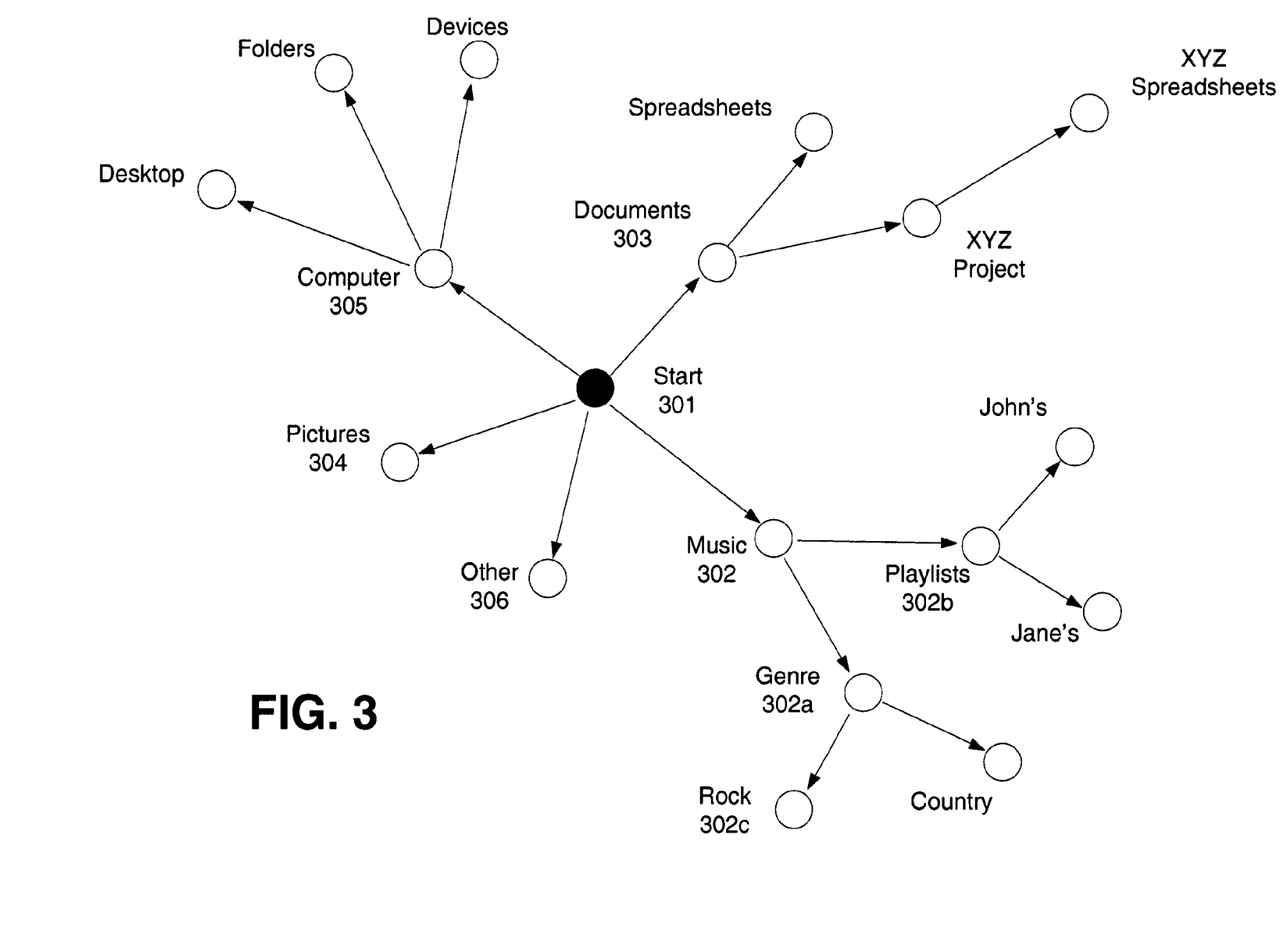
FIG. 3 is a diagram illustrating relationships between browser views.

FIG. 3 shows a relationship diagram illustrating how different panels, such as display regions, may be conceptually related. In some instances, there may be a Start panel 301 that may serve as an initial display region provided to the user to begin browsing through files available through the system. The Start panel 301 may offer the ability to view a different panel for browsing files, such as a Music browser 302, Documents browser 303, Pictures browser 304, Computer browser 305, or any other browser 306 desired by the system and/or user. Each of these browsers may be a top level panel for browsing through files that meet particular criteria. For example, Music browser 302 may display a listing of files on the system that meet certain music criteria, such as audio music file types. The browsers may also offer sub-browsers created using different criteria, such as a Genre 302a browser panel that displays files that meet one or more genre criteria; or a Playlist 302b browser panel that displays files relating to one or more playlists of songs. These panels may, in turn, allow the display of files meeting further criteria. For example, the Genre 302a panel might display a subset of music files that are songs having genre information, and may offer a Rock 302c sub-panel that displays a further subset of music files having a genre of rock and roll. Any number of panels may be created to accommodate any desired relationship and method of displaying file data. The Documents browser 303 may offer separate browsers for certain types of documents (e.g., spreadsheets), or documents pertaining to a given project (e.g., XYZ project).

Each available browser may be defined by a template stored in memory of the computer system. The template could simply be a file identifying the contents of the view, the organization, the features to display, etc. The template may also specify the actual files that are to be displayed in the browser view.

Figure 4:
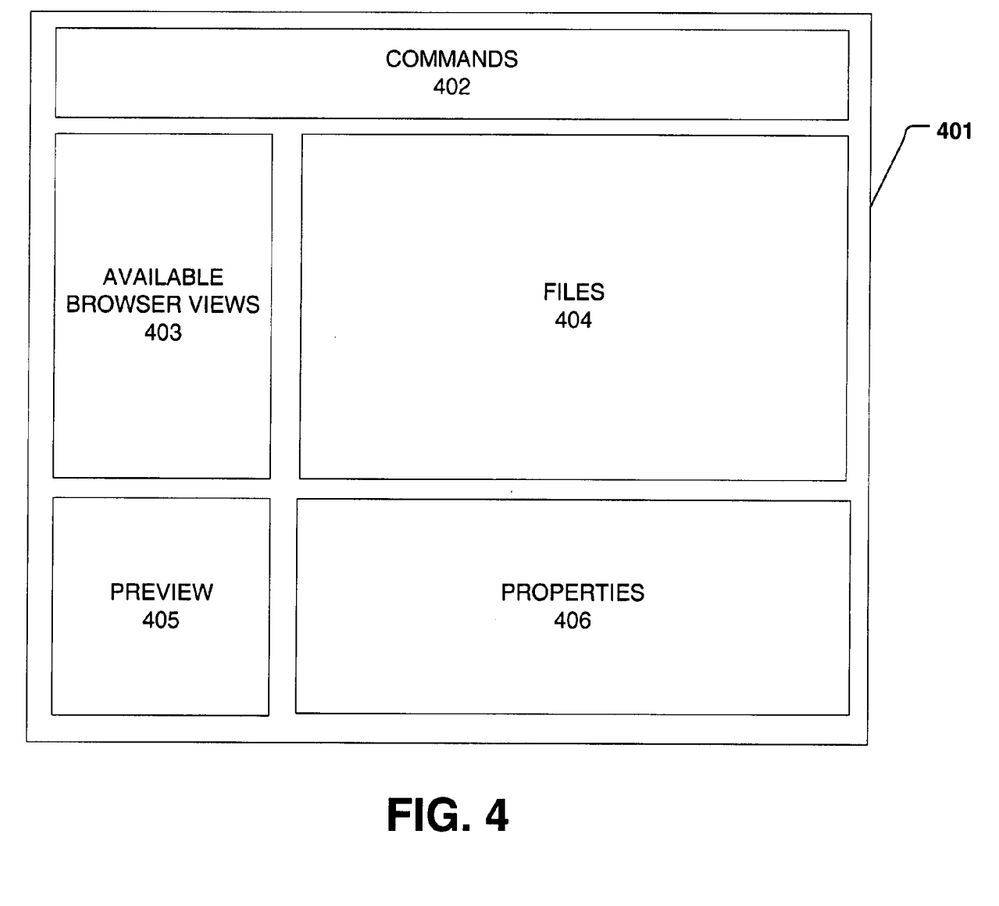
FIG. 4 depicts an example browser interface layout according to aspects of the present invention.

FIG. 4 depicts an example of a browser display 401. The display 401 may include one or more commands 402 offered to the user. The commands may be in any form of command entry, such as menus, links, buttons, icons, or other indicia, and may be custom selected based on the template establishing the browser view. For example, if the browser 401 is a display of music files, then the commands 402 may include specific commands that make sense for music files, such as "Copy to CD," "Play," and/or "Shop for Music Online." Of course, commands 402 may also include commands associated with and shared by various browsers, such as "File" commands for file manipulation (e.g., saving and opening files) and commands for editing the current panel (e.g., creating duplicate panels, or sorting multiple existing panels), and may include menus of commands. In addition to the presence/absence of commands, the commands display 402 may also customize the appearance of the display, such as its color, user interface element details (color, size, positioning, etc.), sequencing of selectable elements, etc.

Display 401 may include a list panel 403 showing the available browser panels. The list may include a listing of all available views on the system, which may be presented in a nested menu/sub-menu format to conserve display area. This range of views may be referred to as a pagespace. The list 403 may alternatively list a subset of browser panels that are associated with the current panel, resulting in a smaller pagespace. For example, if the current display 401 is a music panel, the list 403 may display Playlist and Genre view options, or specific playlists and/or genres that have their own panels.

Display 401 may include a files panel 404, which may contain a listing of the files that meet the criteria established for the current browser panel. The files panel 404 may include indicia representing data files (such as an icon and/or text), and one or more properties of the files (e.g., their names, authors, file sizes, file types, project affiliation, date of creation/modification, etc.). The properties may be arranged, such as in columns, and may be rearranged and/or modified depending on what is appropriate given the criteria used for the selected display 401. For example, a music browser might choose to list the "Song Title" as the first property, with "Artist" and "Album" next, whereas a browser for project XYZ might list the "Edit Date" first, with "File Size" and "File Type" to follow. Certain browser types may wish to omit undesired properties (e.g., the "Album" property may not be very useful for a spreadsheet document). Each browser display 401 may have a customized arrangement of files and associated properties. Column width, row size, indicia appearance (e.g., size, color, etc.), grouping, stacking, and any other display properties may be included in this customization. For example, some browsers may display their files as thumbnails (e.g., picture browsers may do this), while other browsers may simply display the files in a text listing of the files and their properties.

Display 401 may also include a preview panel 405 that provides a preview of the content of one or more selected files from the files panel 404. There may also be a properties panel 406 that displays properties for one or more selected files from the listview data 404. The properties panel 406 may provide greater detail and/or amounts of properties than that shown in listview 404. Display 401 may include other types of display and user interface elements as well, such as navigation commands, panel sizing commands, etc.

Each of the various portions of display 401 may be implemented as distinct software modules. For example, there may be a Commands module that is responsible for defining the user interface elements that are to go into Commands display 402, a Listview module for processing the display elements in the files panel 404, a Preview module for generating the content of the preview panel 405, etc. These modules may expose application program interface (API) elements to facilitate interoperability with other applications, and the various modules may be provided with parameters such as the criteria for a given view, its position, its size, etc. Having distinct modules may simplify the process of defining new panels with different layouts and arrangements.

Figure 5:
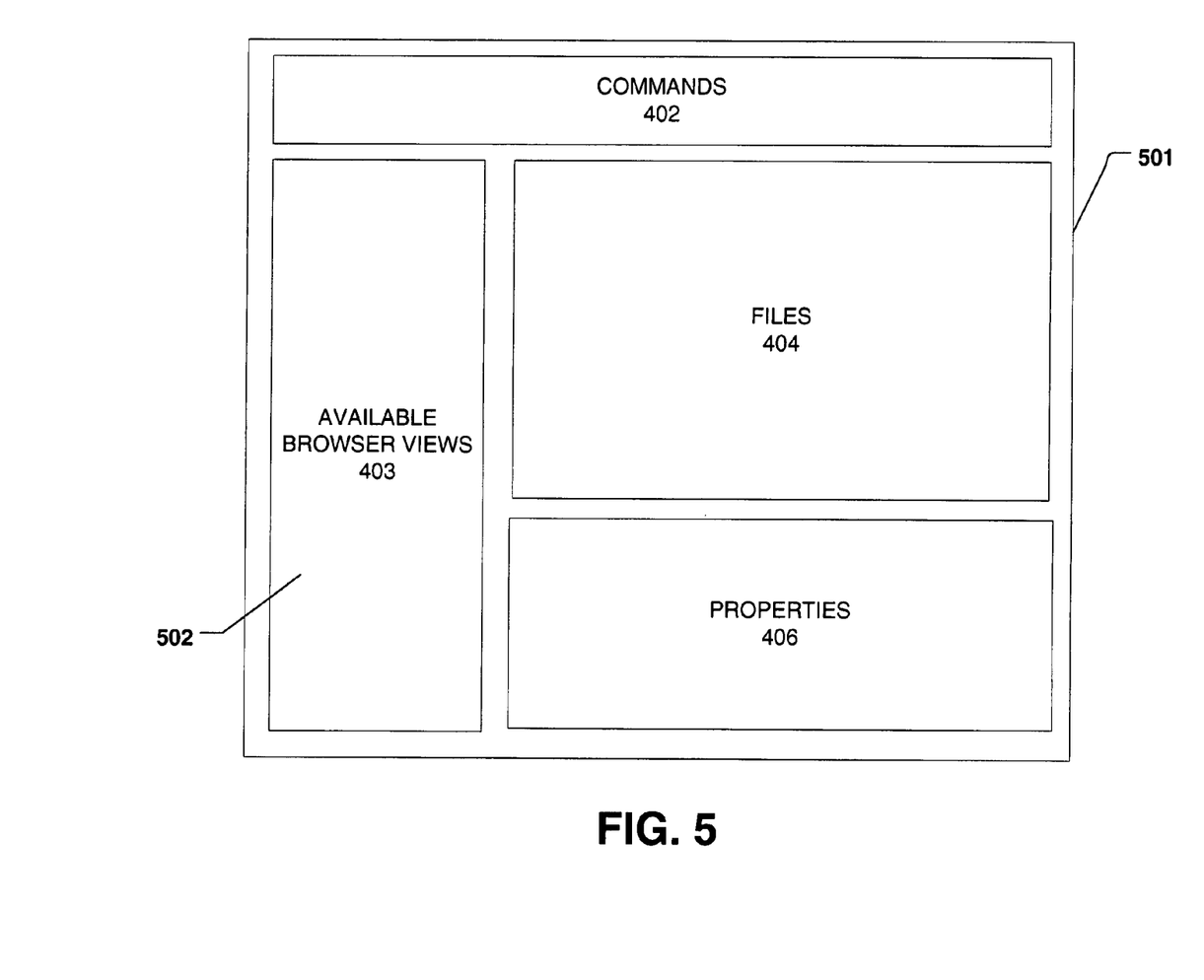
FIG. 5 depicts another example browser interface layout according to aspects of the present invention.

Each browser display 401 may also have differences beyond just having different contents in the display areas discussed above. For example, each browser may have its own customized arrangement of display areas, such that certain areas may be resized/added/removed based on the criteria and/or contents of the particular browser. For example, a music browser might wish to do away with preview panel 405, and offer music commands (e.g., play, pause, cue, add to playlist, burn to CD, etc.) in command area 402. The other display areas may be rearranged and/or resized to take advantage of the space previously occupied by the preview panel. The particular layout of the browser may be set, for example, in the template defining the browser view. For example, FIG. 5 depicts an example of a different browser 501 having elements arranged in a different manner. In that example, the list 502 of available browser views has been enlarged to occupy the space relinquished by the preview panel. As another difference, each browser view may have its own unique display theme, such as watermark pattern, color theme, font, etc., to help further distinguish the view from other views on the system. Context menus (e.g., available commands, text, etc.), user interface behaviors, default commands on left/right mouse clicks, and other display/interaction attributes may also be different for each browser.

Figure 6:
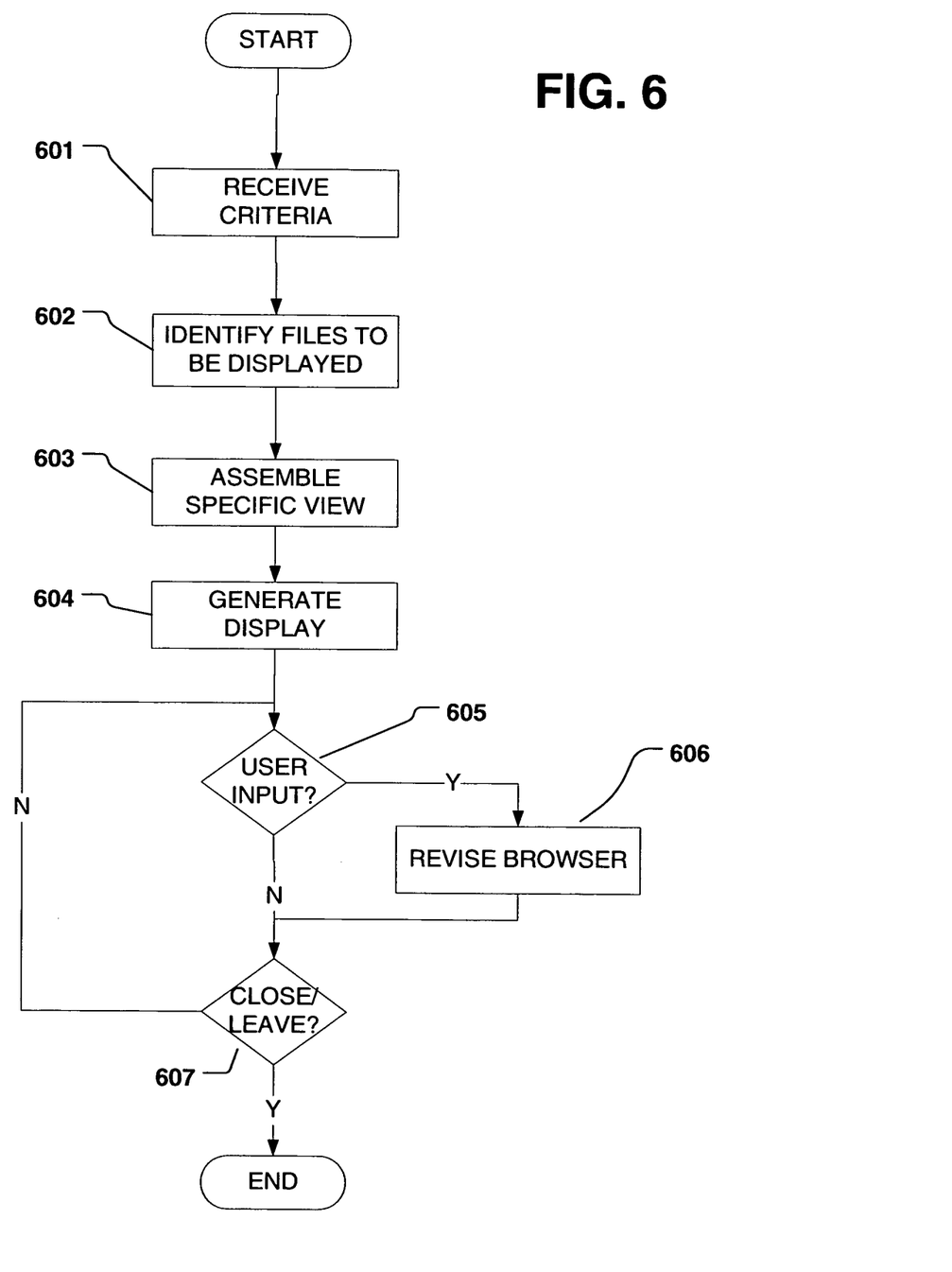
FIG. 6 depicts an example process for browsing files according to aspects of the present invention.

FIG. 6 depicts an example process by which various browsers may be displayed. In step 601, the system may receive one or more criteria defining a view to be displayed. These criteria may come from a variety of sources. For example, the user might have selected a predefined template for display, and the system may simply receive that selection (or the criteria associated with the template). Alternatively, the system may receive criteria for a new view, such as a new view based on a keyword search using keywords supplied by the user.

In step 602, the criteria may be used to identify the various files on the system that satisfy or meet the criteria, and which are to be included in the browser display. These files may be identified through a search of the system's memory, or they may simply be identified from the template information if the template already identifies the files to be listed.

When the files are identified, the system may assemble a specific browser view or panel in step 603. Assembling the panel may include consulting a predefined template to determine the various elements/modules that are needed in the panel. In some instances, the panel may be further customized and/or modified when the files identified for display satisfy a different set of criteria from the ones established for the template, or if the identified files are suitable for display in a different template that has narrower criteria. For example, if the user requests a browser for all files associated with a given project, such as XYZ Project, the system may be expected to provide a project browser panel. Such a panel may have been defined with the possibility that a project may include files of multiple types, and may have separate display regions to segregate files based on file type. However, if a particular project only happens to have files of one type, then the system may dynamically customize the browser panel for the current display. The further customized panel may offer extended command options applicable to the file type, or remove display areas and/or elements that normally would have been used to display files of other types. The browser views may be dynamically modified based on the identity of files that meet the criteria used to establish the panel. Other types of custom assembly may be performed. The browser may adjust the panels depending on the number of files to be displayed, so that a portion of a first display area's screen space may be transferred to a different display area (e.g., a smaller listview is shown, but a larger properties area is shown). The browser may adjust the panels based on the search criteria used to identify the files for display (e.g., the criteria may be incorporated into a predetermined portion of the display, or the results may be arranged based on the criteria and how well the files matched them).

In step 604, the browser view may be generated on a display device associated with the computer system. Then, in step 605, the system may check to determine whether the user has performed an interaction, or supplied an input, to the browser view. User interaction may include editing text, navigating through the pagespace by selecting a different view, and/or interacting with any of the displayed elements on the browser. If the user has given an input, then in step 606 the system may revise the browser in response. The revision to the browser may include removing, adding or modifying one or more of the displayed elements in the browser view, and may result in a dramatically different display. For example, the user viewing a Music browser view may select one of the music files and request to view a Project browser for a project associated with the selected music file—the Project browser may have a completely different display format. The browser displays may be dynamically modified to add and/or remove any of the features described above, which results in a browser interface that continuously provides users with a high level of contextually-appropriate information.

When changing or revising a particular browser, the system may provide visual effects to smooth the transition. For example, animation may be used to show a repositioning of a displayed element, fading can be used to show the addition/deletion of elements, and morphing effects may be used to show one element changing into another one. Although different views are possible, a user (or the system or its applications) may also specify that certain features (e.g., display elements, available commands, menus, etc.) or formats are to remain constant in multiple browser views, to help minimize user confusion.

In step 607, which occurs after step 606, or if no user input has been received in step 605, the system may check to determine whether the browser is to be closed, or left, and if so, the browser process for this browser may end. If not, the process may return to step 605 to await further user input.

Figure 7:
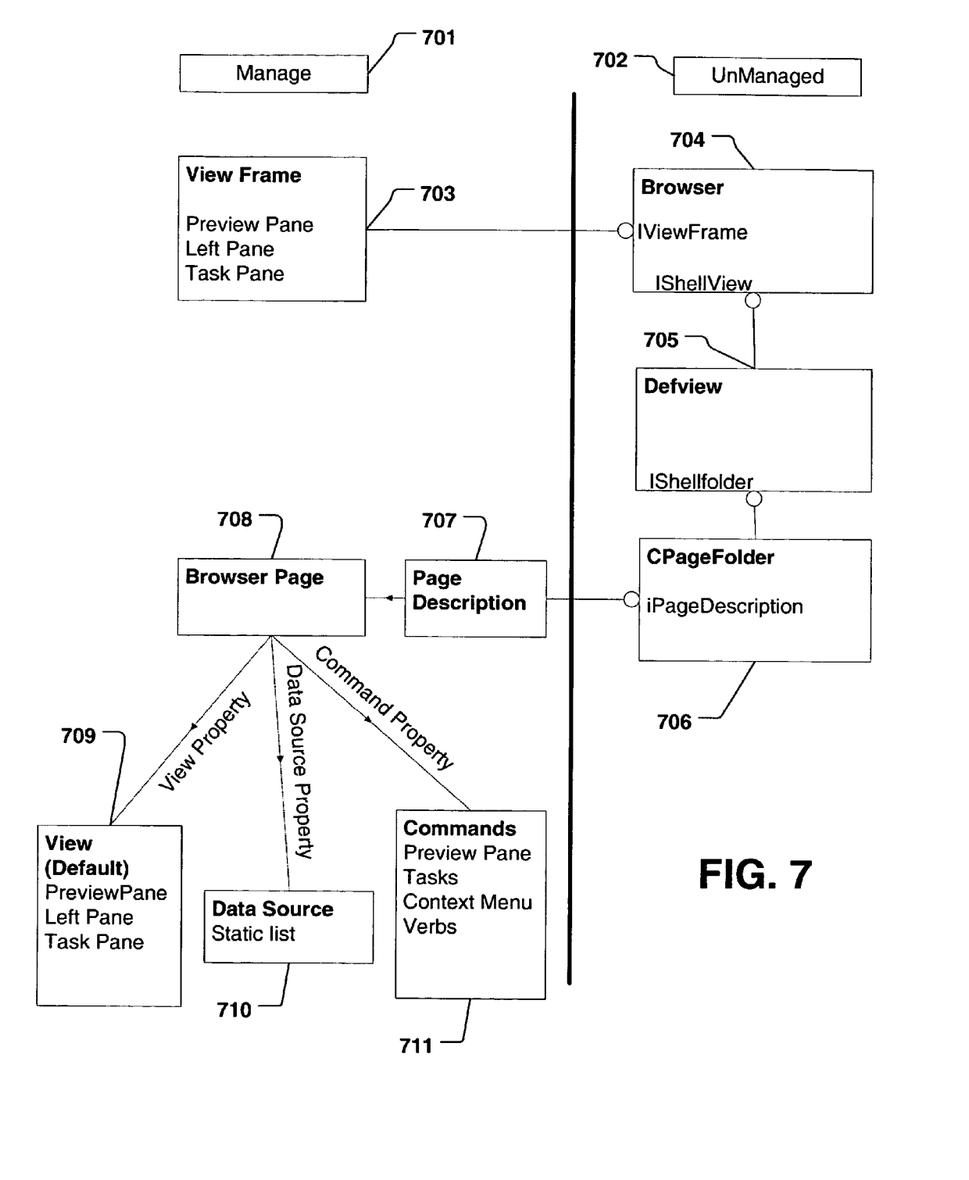
FIG. 7 depicts an example logical relationship among data structures, applications, and/or subroutines that may be used to implement aspects of the present invention.

FIG. 7 illustrates an example diagram of logical relationships that may exist in the system to generate the various browser views described above. Browser views may generally be managed by an underlying operating system (e.g., the Managed 701 group on the left of FIG. 7), or they may be unmanaged by the operating system so that individual post-installation applications may control the views (e.g., the Unmanaged 702 group on the right of FIG. 7). The system may define a basic overall view frame 703, which may define aspects that will be common to multiple views. For example, the basic view frame 703 of the system may include a preview pane, a left pane and a task pane. The basic configuration may be passed (e.g., as a data structure) to an unmanaged browser application 704, which may in turn call a default view routine 705 to generate a desired default browser view for the browser application 704. The application may include a subroutine 706 used to initiate the browser view, and that routine 706 may make access a managed data structure containing a page description 707 that defines the view to be generated for that particular browser application 704.

The page description 707 may include a reference to a browser page structure 708. The browser page 708 structure may include a variety of properties that ultimately define the view. For example, there may be a view property 709 defining the basic attributes to be contained in this view (those attributes may be the same preview pane, left pane and task pane in the basic view frame 703. The page 708 may also have a data source property 710, which may identify a location from which the data that populates the particular view may be obtained. The source 710 may, for example, include a static list of data. The page 708 may also include a command property 711, which may identify the various commands that are to be supported by the view. Each command may be implemented by a separate application and/or routine, and may include commands for handling preview pane tasks, context menu options, etc. Of course, the above is just one example of how the various browser views may be managed and implemented.

The discussion above refers to "browsers," but the features described herein need not be limited to system shell browsers. Any application wishing to offer customized views of data files may take advantage of the features described herein.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein. Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

What is claimed is:

1. A method for browsing files comprising;
   receiving a user request to view files meeting one or more criteria in a browser;
   identifying a plurality of files that meet said criteria;
   selecting one of a plurality of predefined browsers based on results of said step of identifying, wherein characteristics that differentiate the selected browser from other browsers of said plurality are characteristics based on said one or more criteria of said user request, wherein said plurality of predefined browsers includes distinct browsers for use in listing files of different predetermined file types; and
   displaying said selected browser with information regarding said plurality of files, wherein said information is based on said one or more criteria.

2. The method of claim 1, wherein said plurality of predefined browsers offer different display characteristics.

3. The method of claim 2, wherein said plurality of predefined browsers offer different available user commands as said different display characteristics.

4. The method of claim 2, wherein said plurality of predefined browsers offer different display areas as said different display characteristics.

5. The method of claim 4, wherein said different display areas differ in size.

6. The method of claim 1, wherein said one or more criteria includes a plurality of criteria, said one of said plurality of predefined browsers corresponds to said criteria, and said step of selecting further comprises the step of selecting a different one of said plurality of predefined browsers, said different one of said plurality of predefined browsers corresponding to a subset of said plurality of criteria.

7. The method of claim 1, wherein said step of selecting further comprises the step of reordering a sequence of property values of said selected browser based on said step of identifying.

8. The method of claim 7, wherein said step of reordering a sequence of property values includes the removal or addition of one or more properties to be displayed in said selected browser.

9. One or more computer-storage media having computer-executable instructions stored thereon for performing a method of providing browser templates, the method comprising:
   providing a first template defining a first browser view to be used by a file browser when browsing files of a first file type, wherein said first browser view presents information and determines a first set of view characteristics based on said first file type, and wherein said first set of view characteristics include a first set of available user commands; and
   providing a second template defining a second browser view to be used by said file browser when browsing files of a second file type, wherein said second browser view presents information and determines a second set of view characteristics based on said second file type, and wherein said second set of view characteristics includes a second set of available user commands.

10. The one or more computer-storage media of claim 9, wherein said first file type includes files belonging to a first project.

11. The one or more computer-storage media of claim 9, wherein said first file type is a music file type.

12. The one or more computer-storage media of claim 9, wherein the method further comprises:
   receiving a user request to view files meeting one or more criteria in a browser;
   identifying a plurality of files that meet said criteria;
   selecting one of a plurality of predefined browsers based on results of said step of identifying; and
   displaying said selected browser with information regarding said plurality of files.

13. The one or more computer-storage media of claim 12, wherein said plurality of predefined browsers includes distinct browsers for use in listing files of different predetermined file types.

14. The one or more computer-storage media of claim 12, wherein said plurality of predefined browsers offer different display areas as said different view display characteristics.

15. The one or more computer-storage media of claim 14, wherein said different display areas differ in size.

* * * * *